Aug. 4, 1964 A. A. HAGSTROM ETAL 3,143,597

PRINTING TELEGRAPH AUTOMATIC STATION IDENTIFICATION APPARATUS

Filed Dec. 14, 1961 2 Sheets-Sheet 1

INVENTORS
ARTHUR A. HAGSTROM
WALTER J. ZENNER

BY E. F. Kane

ATTORNEY

INVENTORS
ARTHUR A. HAGSTROM
WALTER J. ZENNER
BY E. A. Kane
ATTORNEY

United States Patent Office 3,143,597
Patented Aug. 4, 1964

3,143,597
PRINTING TELEGRAPH AUTOMATIC STATION IDENTIFICATION APPARATUS

Arthur A. Hagstrom, Hoffman Estates, and Walter J. Zenner, Des Plaines, Ill., assignors to Teletype Corporation, Skokie, Ill., a corporation of Delaware Filed Dec. 14, 1961, Ser. No. 159,279
14 Claims. (Cl. 178—4.1)

Figure 1:
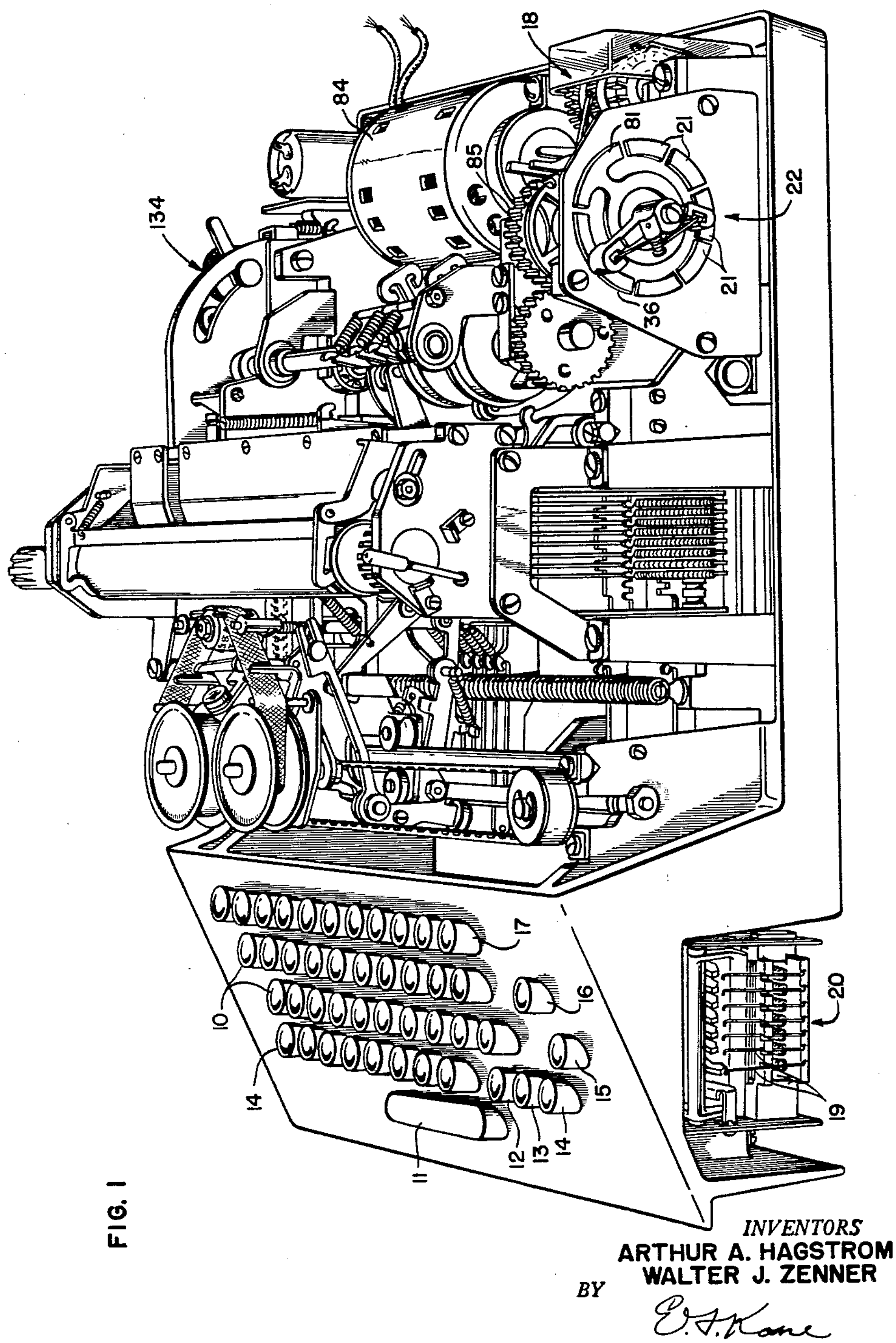

This invention relates to printing telegraph apparatus including a fixed message generator and more particularly to apparatus for automatically transmitting code combinations representative of the identifying address of a station under local or remote controls.

In printing telegraph communication systems it is frequently advantageous for a calling station to request a station, to which it has been connected, to verify the accuracy of the line connection established between the calling and called stations by sending back, from the station to which the connection has been established, a station identification combination of signals whereby the operator at the transmitting station will have assurance that the message to be transmitted will go to the proper station. Another desirable feature in such systems is an arrangement whereby the transmitting station may identify itself to the called station by sending its station identification code combinations to the called station without the operator at the transmitting station having to operate the separate keys on the keyboard to transmit the identifying code combinations.

With the advent of line switching of telegraph messages, apparatus for identifying calling and called stations may be used to great advantage when the line switching apparatus can automatically call the identifying mechanisms into operation or when the calling station is able to identify itself as well as send an "answer back" signal requesting the called station to identify itself by automatically sending its identifying address code combinations back to the calling station.

When the features enumerated hereinbefore are provided it is also desirable to provide interlocks which will prevent interference of some of the mechanisms with each other such as might result in garbled messages. The provision of interlocks becomes more essential when, as is frequently the case, a tape reader is provided for controlling message transmission from punched tape.

Accordingly, it is an object of the present invention to provide apparatus of the simplest possible construction, in a printing telegraph station set, for generating a station identification series of code signals in response to either locally or remotely initiated requests for such an identification.

Another object of the invention is to provide a transmitting mechanism, the operation of which may be controlled either locally or remotely, for use in a combined transmitter and receiver of printing telegraph messages, wherein interlocks are provided for preventing the interference of certain of the telegraph signal controlling mechanisms one with another.

Still another object of the invention is the provision of a simple mechanical arrangement to prevent the initiation of an operation of a local message generating apparatus when a code combination is transmitted from a local printer calling upon a remote printer to send back its address to the local printer.

In accordance with one embodiment of the invention as applied to a printing telegraph apparatus of the type having a keyboard such as that disclosed in the copending application of Louis C. Anderson, Jr., and Arthur A. Hagstrom, Serial No. 159,324, filed December 14, 1961, and provided with a page printing mechanism such as disclosed in the copending sole application of Walter J.

Zenner, Serial No. 159,330, filed December 14, 1961, there is provided a key on the keyboard for initiating the operation of an automatic auxiliary transmitter which will transmit the identifying address of the transmitting station to a telegraph line. The auxiliary transmitting apparatus may also have its operation initiated upon receipt, in the local printing telegraph apparatus, of a signal such, for example, as the code combinations for "Figs-D," requesting that the identifying address of the local telegraph printer be transmitted to the line. Preferably the apparatus is associated with a suitable tape reader and interlocks are provided which prevent operation of keys in the transmitter keyboard from interfering with the transmission of signals originating in the reader.

Figures 2, 3:
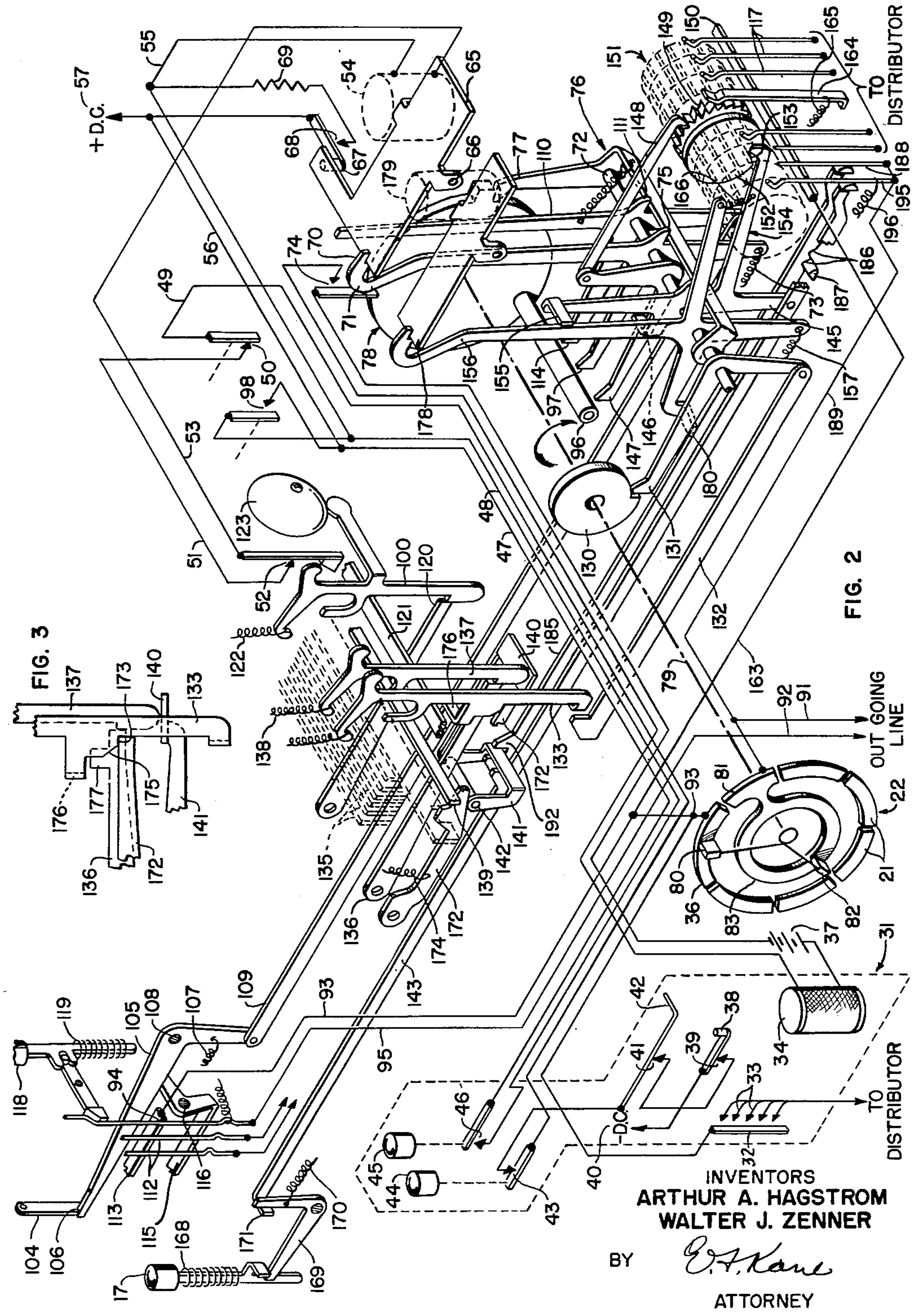

A complete understanding of the invention may be had from the following detailed description when considered in conjunction with the accompanying drawings wherein:

FIG. 1 is a perspective view of a printing telegraph page printer of the type disclosed in the copending applications of L. C. Anderson, Jr., A. A. Hagstrom, and W. J. Zenner, mentioned hereinbefore, in which there is provided a station identification auxiliary transmitter or "answer-back" mechanism;

FIG. 2 is a diagrammatic view showing those portions of the page printer that are involved in the transmission of station identification code combinations of signals; and FIG. 3 is a partial side elevational view of a portion of the mechanism shown in FIG. 2 more clearly illustrating the cooperative relation between some of the parts, the relationship of which is not readily discernible in FIG. 2.

The structure and operation of the apparatus will be apparent by referring to the accompanying drawings, wherein like reference numerals designate the same parts throughout the several views, taking cognizance of the disclosure of the two copending applications mentioned hereinbefore which are incorporated herein by reference insofar as is necessary to provide a complete understanding of the structure and the mode of operation of the various parts illustrated herein and their cooperation one with another in the transmission of telegraph messages.

In the copending application of Louis C. Anderson, Jr., and Arthur A. Hagstrom there is described in detail and claimed a keyboard mechanism having character and function transmitting keys on it for controlling the operation of a plurality of contacts which in turn control the application of current to the code segments of a distributor. The preferred form of keyboard, as illustrated in the copending application of L. C. Anderson, Jr., and A. A. Hagstrom, includes character keys 10, a space bar or key 11, a line feed key 12, a carriage return key 13, a pair of shift keys 15, a space key 16, and in addition thereto a "Here Is" key 17. The keys 10, 11, 12, 13, 14 and 16 control the transmission of code combinations representative of either characters to be printed by a telegraph printer at a remote station or functions of such a printer, such as the line feeding, carriage return, and case shift operations and the repeat key 15 controls the operation of a repeat mechanism such as that disclosed in the copending application of A. A. Hagstrom, Serial No. 159,240, filed December 14, 1961.

The "Here Is" key 17 mechanically controls linkages to be described hereinafter for initiating the operation of an auxiliary transmitter mechanism or answer-back device designated generally by the numeral 18.

As described in detail in the application of L. C. Anderson, Jr., and A. A. Hagstrom identified hereinbefore, the operation of the character and function keys on the keyboard control the setting of contacts 19 in a contact block designated generally by the numeral 20 which preferably is of the type shown in the copending sole application of A. A. Hagstrom, Serial No. 159,228, filed December 14, 1961, now Patent No. 3,084,218, which is incorporated herein by reference for details of disclosure of the construction and operation of it, insofar as is necessary to an understanding of the present invention. The contacts 19 in the contact assembly or contact block 20 control the application of current to code segments 21 of a distributor designated generally by the numeral 22, which preferably is of the type disclosed in the copending application of K. Alonas, A. A. Hagstrom and B. J. Sobczak, Serial No. 159,328, filed December 14, 1961, the disclosure of which is also incorporated herein by reference, insofar as is necessary for a complete understanding of this invention.

The apparatus forming a preferred embodiment of the invention includes a reader 31 which may be of any conventional type for feeding a perforated tape step-by-step to control the cooperation between a common contact member 32 and tape sensing contacts 33, each time an electromagnet 34 is energized. The contacts 33 are individually connected to the code segments 21 of the distributor 22 and the common contact 32 is connected to a lead 93 and to a stop segment 36 of the distributor. Power for operating the electromagnet 34 is provided from any suitable D.C. source such, for example, as the battery 37. The reader 31, as is usual in such devices, is provided with a tape-out sensing pin 38 which, when there is tape in the apparatus, holds a contact pair 39 closed to supply direct current from a source 40 through the closed contact 39 and a normally closed contact 41 controlled by a taut-tape lever 42 and thence through a normally closed reader stop contact 43 which is operable under control of a reader stop key 44 in the reader. The contacts 33 may be engaged with the common contact member 32 under control of sensing pins which are released for movement into engagement with a tape (not shown) each time the electromagnet 34 is energized and the electromagnet 34 upon energization will store energy to feed the tape upon the release of the electromagnet, as is usual in such devices. The reader is also provided with a reader start key 45 which upon being momentarily operated closes a normally open contact pair 46 to interconnect a pair of reader feed lines 47 and 48.

Upon the closure of the normally open contact pair 46, due to the momentary operation of the reader start key 45, a circuit will be completed from the negative D.C. source 40 through normally closed contact pairs 39, 41 and 43, thence over a lead 49, through a normally closed contact pair 50, over a lead 51 through a normally closed contact pair 52 and a lead 53 to one side of the winding of a reader trip magnet 54 which is shown in FIG. 2 in dotted lines in order not to obscure other parts of the apparatus. The other side of the winding of the reader trip magnet 54 is connected by a lead 55 to the reader feed line 48 and upon closure of the contact pair 46 this circuit will be continued over the reader feed line 47 and a lead 56 to the positive D.C. source 57 thereby to energize the reader trip magnet 54.

Energization of the reader trip magnet 54 will attract its armature 65 to cause the armature to rock in a counterclockwise direction (FIG. 2) about a pivot point 66. The left end (FIG. 2) of the armature 65 has a contact actuating extension 67 on it for closing a normally open contact pair 68 which contact pair is connected across the leads 55 and 56 whereby when the reader start key 45 is momentarily operated closing the circuit to the magnet 54, thus energizing the trip magnet 54 which will cause the contact pair 68 to be closed to complete a holding circuit for the magnet 54 from positive D.C. source 57 through the contact pair 68 and a hold current limiting resistor 69 through the lead 55 and through the winding of magnet 54 thence through lead 53, normally closed contact pair 52, lead 51, normally closed contact pair 50, lead 49, normally closed reader stop contact pair 43, normally closed tight-tape contact pair 41, tape-out contact pair 39 to the negative D.C. source 40. Thus, when the reader start key 45 is momentarily operated it will cause the energization of reader trip magnet 54 which will lock operated through the contact pair 68 to hold the reader trip magnet 54 energized until one of the normally closed contacts in the circuit just described is opened momentarily.

When the armature 65 is rocked counterclockwise (FIG. 2), the left end of it will be moved out of engagement with a shoulder 70 on a reader trip lever 71 which is biased to rock in a clockwise direction about a pivot shaft 72 by a contractile spring 73. In rocking clockwise about the pivot shaft 72, the reader trip lever 71 will permit a reader feed contact 74 to close to complete a circuit from one side of the battery 37 through the contact 74 to one side of the winding of the electromagnet 34 and through the winding of the electromagnet 34 to the other side of the battery 37 to initiate a cycle of operation of the tape feeding mechanism (not shown), and of the tape sensing contacts 33.

A bail actuating arm 75 is formed on the reader trip lever 71 and when lever 71 rocks clockwise it will rock a clutch stop bail 76 about the pivot stud 72 in a clockwise direction (FIG. 2) to disengage a stop projection 77 (which is the same as the stop projection 567 of the copending application of W. J. Zenner mentioned hereinbefore), from blocking relation to a distributor clutch 78. The movement of this stop projection 77 will initiate a cycle of operation of the distributor clutch 78. The distributor clutch 78 drives a distributor shaft 79 (similar to the shaft 44 of said Zenner application) to drive a distributor brush 80 through one complete revolution from the position shown in the drawings where the brush 80 is in engagement with the stop segment 36 of the distributor into engagement with a start segment 81 of the distributor and thence into engagement with the successive code segments 21 of the distributor 22 and back to the position shown in the drawings. As described in detail in the aforementioned copending application of K. Alonas, A. A. Hagstrom and B. J. Sobczak a brush 82 of the distributor rides on a commutator ring 83 that is connected with the start segment 81 and on each cycle of rotation of the shaft 79 the distributor 22 will transmit code combinations of signals to an outgoing telegraph line comprising conductors 91 and 92 under control of the sensing contacts 33.

Power for driving the shaft 79, when the clutch 78 is tripped, is derived from a motor 84 through gearing 85 which motor and gearing are the same as the motor 37 and gearing 38 disclosed in the aforementioned application of W. J. Zenner.

In the usual printing telegraph system the normal condition of the transmission line is "marking" or current. Consequently, the circuit for applying signals to the outgoing line as represented by the conductors 91 and 92 would be from the line 91, through the start segment 81, brushes 82 and 80, stop segment 36, over a lead 93 to a normally closed line break contact 94 and thence through a lead 95 to the conductor 92. Upon initiation of a cycle of operation of the distributor 22 the brush 80 will move into engagement with the start segment 81 of the distributor to break the connection between the conductors 91 and 92 thereby to send a no-current or "spacing" pulse to the outgoing line. If the brush 80 moves around the segments 22 in succession it will interconnect the conductor 91 through the brush 82 with the sensing contacts 33 and if any combination of sensing contacts 33 have been connected with the common contact member 32 a circuit will be completed through the sensing contacts 33, common contact member 32, stop segment 36, conductor 93, through the line break contact 94, over lead 95 to the conductor 92 to complete the circuit between conductors 91 and 92 and transmit current or "marking" pulses.

As long as there is tape in the reader 31 the distributor will continue to cycle and the electromagnet 34 will be pulsed to step a new section of tape into the reader under control of reader feed contact 74 which will be opened by the reader trip lever 71 once in each cycle of the clutch 78, due to the fact that the clutch 78 drives a cam roller 96 into engagement with a cam arm 97 of the reader trip lever 71 to rock the reader trip lever 71 counterclockwise (FIG. 2) against the action of its spring 73. If the reader trip magnet 54 has been released in any cycle of the distributor 22 the reader trip lever 71 will be latched in the position shown in FIG. 2 to stop pulsing the reader magnet 34. Thus, the character selection set up in the sensing contact 33 will be distributed by the distributor 22 onto the outgoing signal line as represented by the conductors 91 and 92 and if any one of the reader contacts, such as contacts 39, 41 and 43 is open the reader will stop at the end of that cycle of the apparatus.

Thus far, the operation of the reader under control of the reader start key 45 has been described. The reader 31, however, may be started from a remote printer upon the receipt of a signal in the home or local printer, illustrated herein, by the remote printer transmitting a signal or combination of signals to close a normally open contact pair 98 in the local printer which may be closed upon the operation of a function pawl similar to the function pawl 399 disclosed in the copending application to W. J. Zenner mentioned hereinbefore. This function pawl for closing the remote reader start contact pair 98 may be actuated upon the receipt of the signal in the home printer which will actuate its associated function pawl. When this contact pair 98 is closed momentarily, the circuit for energizing the reader trip magnet 54 may be completed by shunting the magnet locking contact pair 68 in the same manner that the reader start contact pair 46 shunted this magnet locking contact 68. Similarly, the reader may be stopped upon the receipt of a signal in the printer, disclosed herein, which would cause actuation of a function pawl to open the remote reader stop contact pair 50 momentarily thereby to break the holding circuit to the reader trip magnet 54.

When the reader 31 is operating to transmit code combinations through the distributor 22, it may be stopped by breaking the holding circuit to the reader trip magnet 54 by operating the reader stop key 44, thus breaking the holding circuit to the magnet 54. It will only be necessary to operate the key 44 momentarily to break this holding circuit. If the supply of tape in the reader 31 is exhausted and consequently the tape-out sensing pin 38 is permitted to move upwardly it will open the contact pair 39 and in like manner if a taut-tape condition exists the taut-tape lever 42 will be operated to open the contact pair 41. The momentary opening of either of these contact pairs 39 or 41 will break the circuit to the magnet 54 and stop the operation of the reader. If the reader has stopped due to the operation of either the tape-out sensing pin 38 or the taut-tape lever 42 the reader may be restarted by the reader start key 45 in the same manner as described hereinbefore. The circuit to the reader trip magnet 54 may also be interrupted by opening the line break contact 94 and this may be effected by operating a line break key 118 provided in the keyboard. Since the opening of the line break contact 94 establishes a "spacing" or no-current condition on the outgoing line the distributor 22 will transmit no current throughout its cycle of operation and when this occurs a function pawl known as the "blank" function pawl 100, which is of the same type as the pawl 399 described in the aforementioned Zenner application, will be operated and in being operated will open the reader stop on line break contact pair 52. This contact is wired in series with the other stop contacts such as the taut-tape contact pair 41, etc., and hence when the contact pair 52 is opened the magnet 54 will be released and if it is desired to restart the reader, the reader start key 45 must be reoperated.

The keyboard mechanism of the copending application of L. C. Anderson, Jr., and A. A. Hagstrom mentioned hereinbefore may also control the operation of the distributor 22 and will initiate a cycle of operation of the distributor 22 each time a key, such as one of the keys 10, is operated. This is effected by the key 10, in being operated, actuating a keyboard trip latch 104 (the member 116 of the L. C. Anderson, Jr., and A. A. Hagstrom application) to rotate the latch 104 counterclockwise (FIG. 2). A keyboard trip lever 105 is normally held under a shoulder 106 of the latch 104 which is spring biased in a clockwise direction (FIG. 2) and when the latch 104 is rocked counterclockwise, the trip lever 105 will be rocked clockwise about a pivot 108, by a spring 107.

Pivotally attached to the keyboard trip lever 105 is a trip link 109 which has its right end pivotally connected to a clutch trip lever 110 that is pivoted on the pivot shaft 72. This clutch trip lever 110 has a bail actuating portion 111 which, when the lever 110 is rocked clockwise, will rock the clutch stop bail 76 in a clockwise direction to initiate a cycle of operation of the distributor clutch 78 in the same manner as described hereinbefore in connection with the tripping of this clutch 78 by the reader 31. As described in detail in the copending application of L. C. Anderson, Jr., and A. A. Hagstrom the operation of the keys 10 in the keyboard will permutatively actuate contact springs 112 to connect a common contact bar 113 selectively to various of the code segments 21 of the distributor 22 so that, when the distributor clutch 78 is tripped and the distributor 22 is driven through a cycle of operation, circuits will be completed for transmitting code signals out over the conductors 91 and 92 as controlled by the key 10 on the keyboard which has been operated. Thus, the character combination set up in the keyboard by selective manipulation of the contact springs 112 will be distributed to the signal line over the conductors 91 and 92.

At the end of the cycle of the distributor 22, the cam roller 96 will engage a laterally extending cam arm 114 of the clutch trip lever 110 to rock the clutch trip lever 110 counterclockwise, resetting the mechanism. The contact springs 112 will be disengaged from the common contact bar 113 at the end of the cycle of operation of the distributor 22 due to the fact that in being rocked counterclockwise by the cam roller 96 the clutch trip lever 110 will retract the trip link 109 against the action of the spring 107 and in so doing will rock a restoring bail 115 clockwise about its pivot 116 to disengage the contact springs 112 from the common contact bar 113. This restoring bail 115 will hold the contact springs 112 out of engagement with the common contact bar 113 at the end of the cycle of operation of the distributor 22. This will prevent interference of these contacts with the operation of the reader contacts previously described or with a group of answer-back contacts 117, the operation of which will be described in detail hereinafter.

The line break contact 94, described hereinbefore, is connected to the lead 95 and the output of the keyboard contacts comprising the springs 112 and bar 113 is applied to the outgoing line through this lead 95. A line break key 118 in the keyboard upon being moved downwardly against the action of its restoring spring 119 will open the line break contact 94. The line thus broken, upon the operation of the key 118 will, as pointed out hereinbefore, cause the operation of the "blank" function pawl 100 in both the local printer and the remote printer. When this pawl 100 is operated it will, of course, in the complete cycle of the printer, be released or stripped from its function lever 120 by a function restoring bail 121 which is the same as function restoring bail 398 of the hereinbefore mentioned copending application of W. J. Zenner. When this occurs the blank function pawl will be moved upwardly by its spring 122 to strike a signal bell 123 and attract the operator's attention at both the local and remote printers.

The distributor shaft 79 has a blocking cam 130 mounted on it which, once in each cycle of the distributor 22, rocks a blocking follower 131 counterclockwise to move a blocking link 132 to the right (FIG. 2). This blocking link 132 cooperates with a blocking lever 133 and each time the blocking cam 130 goes through a cycle of rotation, the link 132 will rock the blocking lever 133 counterclockwise. Thus, in each cycle of the distributor 22, whether the distributor operates under control of the keyboard, under control of the reader or under control of the answer-back, this blocking lever 133 will be operated. When a code combination is received in the local printer from a remote printer, the blocking lever 133 will be in its unlatched or unblocking position as shown in FIG. 2. Upon the receipt in the local printer of an answer-back signal, the selector mechanism designated generally by the reference numeral 134 in FIG. 1, which is the same as the selector mechanism 31 of the copending application of W. J. Zenner mentioned hereinbefore, will selectively arrange a group of printer code bars 135 (shown in dotted lines in FIG. 2 in order not to obscure other parts of the apparatus) in accordance with the received signal. When these code bars are selectively positioned, an answer-back lever 136 will be permitted to move upwardly or counterclockwise (FIG. 2) to register with an answer-back pawl 137 which will then be rocked by its spring 138 into position to be driven downward by the answer-back lever 136 when the answer-back lever 136 is actuated by a function drive bail 139, which is the equivalent of the so called stripper bail 345, of the aforementioned application of W. J. Zenner. Immediately after the answer-back function pawl 137 has actuated the answer-back trip bail 141 the answer-back function pawl 137 will be stripped from engagement with the answer-back lever 136 by the function restoring bail 121. When in the cycle of the printer, the function drive bail 139 drives the answer-back pawl 137 downwardly the lower end of the vertical portion of the pawl 137 will engage a transversely extending portion 140 of an answer-back trip bail 141 to rock this bail clockwise about a pivot shaft 142. The bail 141 will move an answer-back trip link 143 to the left (FIG. 2) against the action of a spring 166. The trip link 143 in moving to the left rotates an answer-back control lever 145 clockwise about the pivot shaft 72. The answer-back control lever 145 has a horizontally extending portion similar to the bail actuating arm 75 for actuating the clutch stop bail 76 releasing the distributor shaft 79.

The answer-back control lever 145 has a laterally extending arm 146 which extends over an answer-back feed lever 147 which is spring biased in a clockwise direction and which will thus be allowed to follow the motion generated by the camming roller 96 during an answer-back operation. The follower portion of the answer-back feed lever 147 normally rests on the arm 146 of the answer-back control lever 145. The answer-back control lever 145 is rocked clockwise, the arm 146 will permit the answer-back feed lever 147 to rock clockwise until the follower portion of the answer-back feed lever 147 strikes the camming roller 96. However, further clockwise rotation of the answer-back control lever 145 will release the clutch 78 and the camming roller 96 will move clockwise with the distributor shaft 79 permitting the follower portion of the answer-back feed lever 147 to rock clockwise under the action of its spring until it again strikes the laterally extending arm 146 on the answer-back control lever 145 which serves as a stop for the feed lever 147. An answer-back feed pawl 148 is pivoted on an upwardly extending portion of the answer-back feed lever 147 and cooperates with a ratchet 149 formed on an answer-back drum 151 which is made of an insulating material but otherwise is of the same general construction as the message storage drum 32 of Patent No. 2,701,822 to T. I. Przysiecki, issued February 8, 1955. The answer-back drum 151 is provided with a plurality of circumferentially disposed levels of tines extending radially in axially aligned rows and each row may have tines broken out of it to set up a permutation code on part of the drum and circuit controlling combinations on other parts. In the presently disclosed embodiment of the invention there are seven levels and twenty-one rows of tines whereby at any one of the twenty-one rotative positions of the drum a permutation code signal may be set up on five of the levels and other circuits may be controlled by the remaining two levels of each row. Thus, by selectively breaking out tines in the five levels associated with the answer-back contacts 117 any desired permutation code combination may be prepared at each of the twenty-one rows except the one in the home position where all of the tines are left on the drum to hold their associated contacts 117 away from the common contact bar 150 so as not to interfere with operation of the reader 31 and keyboard keys. The drum 151 thus serves to actuate the answer-back contacts 117 selectively to permit them to engage a common contact bar 150 selectively to control the transmission of permutation code signals over the outgoing line as represented by the conductors 91 and 92.

The answer-back drum 151 has a cam 152 on it which has an indentation 153 into which the end of a follower arm 154 of the answer-back control lever 145 will move when the drum 151 is in its normal home position. As soon as the answer-back trip link 143 is moved to the left (FIG. 2) the end of the follower arm 154 will move out of the indentation 153 in cam 152 and when the answer-back feed lever 147 is actuated, as described hereinbefore, the feed pawl 148 will rotate the drum 151 and cam 152 to a position where the end of the follower arm 154 will be on the high portion of the cam 152.

The answer-back function pawl 137 is stripped from the answer-back lever 136 immediately after the pawl 137 has actuated the answer-back trip bail 141 and this occurs just prior to the end of the function cycle responding to the receipt of the answer-back characters in the selector mechanism 134. The answer-back trip link 143 and the answer-back control lever 145 will be urged to return to their unoperated position, i.e., to move the end of the follower arm 154 into indentation 153 in the cam 152, thereby tending to pull the camming surface of the answer-back feed lever 147 out of the path of the camming roller 96 and thus tend to prevent the lever 147 from operating the answer-back feed pawl 148 during the first cycle of the apparatus after the receipt therein of the signals calling for an answer-back operation. This would, if not prevented, cause the answer-back mechanism to be stopped after the first cycle. However, when the feed lever 147 is unblocked by the rocking of the answer-back control lever 145, the feed lever 147 is rotated clockwise far enough to move the pawl 148 over one tooth on the ratchet 149 after the camming roller 96 moves out of the path of the lever 147. The ratchet 149 has associated with it a detent 164 which is urged into engagement with the teeth of the ratchet 149 by a spring 165. This spring 165 is strong enough so that it will prevent the answer-back control lever 145 from rocking counterclockwise under the combined, opposing action of the spring (not shown) for the answer-back feed lever 147 and the spring 166. Thus, the first tooth on the ratchet 149 serves as a latch to latch the control lever 145 in the operated position during this first cycle. The answer-back drum 151 is so arranged that the first character coded on it is "blank," i.e., the contacts 117 are held away from the common contact bar 150 when the drum 151 is in the home position by leaving the tines on the drum 151 in the five levels associated with contacts 117. This arrangement is provided since the answer-back contacts 117 must be held open in the stop or home position so as not to interfere with character code combinations selectively set up during the operation of the keyboard or the reader. It is undesirable to feed this "blank" signal to the outgoing line and the transmission over the signal line is blinded as will be described hereinafter.

Near the end of a cycle of operation of the distributor shaft 79, the cam roller 96 will rock the answer-back feed lever 147 counterclockwise about the pivot shaft 72 to cause the feed pawl 148 to rotate the answer-back drum 151 one step. During this first step of the answer-back drum 151 the high portion of the cam 152 moves into blocking relation to the extension 154 of the answer-back control lever 145 to prevent the answer-back control lever 145 from returning to the position shown in the drawings where the end of the extension 154 would register with the indentation 153 in the cam 152. The answer-back control lever 145 will be held in this clockwise position by the cam 152 to hold the clutch 78 "open" through a complete cycle of rotation of the answer-back drum 151 thereby to cause the transmission of the answer-back characters or address of the local station, as coded on the drum 151 out over the outgoing line. The circuit for controlling these character representing signals will extend from the answer-back contacts 117 to the code segments 21 of the distributor and from the common contact bar 150 over a lead 167 which is connected through the lead 93 and line break contact 94 to the lead 95 connected to conductor 92. Thus, any characters represented by combinations of contact or no contact codes on the answer-back drum 151 will be transmitted out over the line. When the drum 151 reaches its home position, as shown in the drawings, the answer-back control lever 145 will return to the position shown in the drawings due to the fact that the end of the follower arm 154 will move into the indentation 153 on the cam 152, thus, allowing the clutch stop bail 76 to return to normal position as shown in the drawings to stop rotation of the shaft 79.

When it is desired to transmit the address of a local station over the outgoing line the "Here Is" key 17 may be operated. This key is normally held in its upward position by a spring 168 and upon being depressed will rock a bell crank lever 169 counterclockwise against the action of a spring 170. The upwardly extending arm of the bell crank lever 169 is disposed in abutting relation to a bent-over portion 171 of the answer-back trip link 143. Consequently, when the "Here Is" key 17 is operated the answer-back trip link 143 will be drawn to the left (FIG. 2) to initiate the same operation as was initiated when the answer-back trip bail 141 moved the link 143 to the left.

The answer-back mechanism as pointed out hereinbefore may be started in operation upon the receipt in the local printer of an answer-back sequence of signals, for example, signals representing "Figs-D." However, when this sequence is set up on the keyboard of the local printer to request an answer-back from a remote printer the answer-back mechanism at the local printer is prevented from being tripped by blocking the operation of the answer-back function lever 136 during every cycle of operation of the apparatus where locally generated characters or functions are being transmitted. During the cycle of operation of the distributor mechanism 22, whether initiated from keys 10, 11, 12, 13 or 14 in the keyboard or from the reader 31, the blocking cam 130 will be rotated through a complete cycle of rotation and when it does so it will rock the blocking cam follower 131 counterclockwise about the pivot shaft 72 thus pulling the blocking link 132 to the right (FIG. 2).

The blocking link 132, in being moved to the right (FIG. 2), will rock the blocking lever 133 counterclockwise (FIG. 3) until it releases a blocking latch 172 from beneath a shoulder 173 on the blocking lever 133. The blocking latch 172 will rock upwardly under the influence of a spring 174 until it engages the underside of the function drive bail 139. During the initial portion of the function sensing cycle of the apparatus, as described in the copending application of W. J. Zenner, mentioned hereinbefore, the function drive bail 139 and the blocking latch 172 move upward causing the end of the blocking latch 172 to slide up a cam surface 175 on the blocking lever 133 thus to rotate the blocking lever 133 farther in a counterclockwise direction. The blocking lever 133 has a transversely extending portion 176 on it which lies in the path of a tab 177 on the answer-back function lever 136 to prevent the function lever 136 from rocking high enough during the sensing portion of the function cycle to allow the answer-back pawl 137 to be engaged and selected. The operation of the answer-back mechanism in the local printer is thus inhibited.

During the work stroke of the function drive bail 139, that is, when it is rocked downwardly to drive the selected function lever downwardly, the blocking latch 172 is also moved downwardly by function drive bail 139 to the point where the blocking lever 133 is released and allowed to reset clockwise to its initial position. In this manner the code combination set up by the operation of the keyboard will be transmitted during the cycle of the distributor 22 and the function mechanism will then be stripped to restore the apparatus to its normal condition. In this manner the source of any character being sensed by the answer-back function lever 136 will be recognized and if the signal being generated originates at the local printer either through operation of keys on the keyboard or by operation of the reader or answer-back, the local answer-back mechanism will not be tripped. If any character is generated remotely and is sent into the selector mechanism 134 thereby to control the operation of the printer code bars 135 the blocking mechanism just described will not be operated and the answer-back function lever 136 is not blocked from sensing the code bars. This procedure is repeated in each cycle of operation from the keyboard, reader or answer-back mechanism.

In some types of operation it is desirable to provide means for tripping the answer-back mechanism of a local printer by mechanisms other than the keys in the keyboard printer, including the "Here Is" key 17 and a remotely generated signal combination coming from a remote printer. In order to accomplish this function the trip lever 156 is spring biased against the edge of an answer-back trip magnet armature 178 which may be moved out of blocking engagement with the answer-back trip lever 156 upon energization of an answer-back trip magnet 179. This magnet 179 may be energized by such a mechanism as a subscriber set (not shown) which has completed a connection to a called printer over a switching system and when the answer-back trip magnet 179 is energized its armature 178 will move out of blocking relation to the answer-back trip lever 156 allowing the trip lever 156 to rock clockwise under the influence of its spring 157. When the trip lever 156 rocks clockwise it will engage extension 155 of the answer-back control lever 145 which will, in turn, actuate the clutch stop bail 76 to initiate a cycle of operation of the answer-back drum 151 by rocking clutch stop bail 76 out of blocking engagement with the clutch 78. This cycle will be the same as described hereinbefore in connection with the tripping of the clutch 78 under control of the "Here Is" key 17 or the answer-back function pawl 137.

Upon the first cycle of rotation of the distributor shaft 79, during the answer-back cycle, the blocking follower 131 is rotated counterclockwise (FIG. 2) by the blocking cam 130 to perform its normal function as described hereinbefore. The blocking follower 131 in rotating counterclockwise rocks the answer-back trip lever 156 due to the fact that the trip lever 156 is provided with a laterally extending tab 180 which lies in the path of the blocking follower 131. When the answer-back trip lever 156 is thus rocked counterclockwise it will be latched in the position shown in FIG. 2 due to the fact that the answer-back trip magnet 179 will have been released at this time and consequently, the trip lever 156 will be latched by the armature 178 and will remain in this position until the magnet 179 is again re-energized.

With the apparatus disclosed herein it is possible to arrange for two-way identification, that is, to cause the local printer to transmit its address to a remote station or printer and the remote printer, after receiving the address of the local printer, will automatically send its address back to the local printer. With the same arrangement the remote printer, upon transmitting its address to the local printer, due to the operation of the answer-back trip magnet 179 at the remote printer, may call upon the local printer to transmit its address to the remote printer.

These features may be achieved by breaking off tines in the final rows of the drum 151 to set up thereon the code combinations for answer-back, for example, the code combinations for "Figs-D." When this is done, the last characters forming the fixed message will cause the answer-back pawl 137, at the receiving printer, to be actuated thus, to initiate a cycle of its answer-back drum 151. These operations will take place only when the initial operation of an answer-back drum 151 is started by either the "Here Is" key or the answer-back trip magnet 179 since signals generated at a printer either through operation of its keys 10 or its reader 22 will prevent operation of its answer-back mechanism in the manner now to be described.

In order to avoid the possibility of an unending series of answer-back operations being transmitted back and forth between the local and remote printers, mechanism is provided for suppressing such an operation. This mechanism includes an answer-back suppression link 185 which, upon being operated, will suppress the transmission of the answer-back call character from the drum 151 when an answer-back operation is initiated by the answer-back function pawl 137 of a printer. The answer-back suppression link 185 has a pair of detent notches 186 formed in it for cooperation with a spring pressed detent member 187 whereby when the answer-back suppression link 185 is shifted from the position shown in the drawings toward the left (FIG. 2) it will release an answer-back suppression contact 188 to permit the contact 188 to move toward the drum 151 so that the contact 188 may be controlled by tines on the drum 151. It will be understood that the answer-back suppression link 185 is normally held in its right-hand position as shown in FIG. 2 by the detent member 187 engaging the left-hand detent notch 186. This suppression contact 188, when the answer-back suppression link 185 is in the position shown in FIG. 2, rides a set of tines on the answer-back drum 151 and the tines would be left in position so that they would hold the suppression contact away from the common contact bar 150 except when the drum 151 is in the rotative positions to transmit an answer-back code set of signals, such as "Figs-D." Thus, when an answer-back is initiated by answer-back trip magnet 179 the answer-back suppression contact 188 will be held away from the answer-back drum 151 and the signals calling for an answer-back will be sent over the outging signal line due to the fact that the conductors 91 and 92 will not be shunted.

When the answer-back suppression link 185 is moved to the left the answer-back suppression contact 188 will ride the tines on the answer-back drum 151 at all positions of the drum except those positions of the drum at which the local station calls for an answer-back from the remote station by sending an answer-back signal such as "Figs-D." Thus, when an answer-back cycle is initiated by the answer-back trip magnet 179 or by operation of key 17 the contact 188 will be held away from the common contact bar 150 and the answer-back signal will be sent onto the signal line calling in the local printer answer-back mechanism.

The local or sending printer may be requested, by a remote printer, to send its address upon receipt in the local printer of the "Figs-D" signal combination which will result in actuation of the answer-back pawl 137 which, as described hereinbefore, wall actuate the clutch stop bail 76 to pull the answer-back trip link 143 to the left (FIG. 2). When this occurs the answer-back suppression link 185 will also be pulled to the left-hand position by the answer-back trip bail 141 engaging a tab 192 on the answer-back suppression link 185 to move the link 185 to position where the detent member 187 will engage in the right-hand detent notch 186. This will permit the answer-back suppression contact 188 to ride the answer-back drum 151. After the answer-back mechanism 18 has transmitted its address over the outgoing line and the drum has rotated to the point where it would be coded with an answer-back calling arrangement the answer-back suppression contact 188 will be permitted to engage with the common contact bar 150 due to the fact that tines on the drum are broken away at these points and the outgoing lines would be shunted to prevent the transmission on the line of the answer-back code combination "Figs-D." An additional cycle of operation of the answer-back mechanism at the remote station is thus prevented. The shunt circuit will extend from the conductors 91 over a lead 189 through the suppression contact 188, common contact bar 150, lead 167, lead 93, the line break contact 94 and lead 95 to the conductor 92. At the end of the transmission of the code combination representative of the address of the local printer by the answer-back drum 151 the answer-back trip link 143 will move to the right as described hereinbefore, will actuate the clutch stop trip bail 141 in a counterclockwise direction to its normal position. As the bail 141 rocks counterclockwise (FIG. 2) it will push the answer-back suppression link 185 to the right where this link will be detented by the detent member 187 entering the left-hand detent notch 186 to push the answer-back suppression contact 188 away from the drum 151. This will restore the mechanism to its normal position as shown in the drawings.

In some telegraph systems the sending of a "blank" code combination is undesirable as pointed out hereinbefore and in others it is intolerable. For example, since a "blank" signal is all "spacing" or no current, it may be indistinguishable from a break in the line and may break down a connection which has been established from a transmitting to a reeciving printer. In order to prevent the transmission of a "blank" signal over the line, upon initiation of an answer-back cycle, the outgoing line, as indicated by the conductors 91 and 92, is shunted. This shunting of the outgoing line is effected by a first character blinding contact 195 that is urged toward the common contact bar 150 by a spring 196 and that is connected to lead 189 to shunt the outgoing line in the same manner as it was shunted by the answer-back suppression contact 188.

When the answer-back trip link 143 is in its normal, unoperated position, its right end will engage the first character blinding contact 195 and hold it away from the common contact bar 150. The circumferentially extending row of tines on the drum 151 that is aligned with the first character blinding contact 195 has the tine cooperating with the contact 195 in the stop or home position removed so that in this position a circuit is closed between the contact 195 and contact bar 150 when the answer-back trip link 143 is moved to the left. The tines on the drum 151 in all rotative positions of the drum except the first tine, in the stop position, will hold the first character blinding contact 195 out of engagement with the common contact bar 150 so that after blinding the outgoing line to the first or "blank" character of the printer address code combination the contact 195 will be held out of contact with the common contact bar until the end of the answer-back cycle. At the end of the answer-back cycle the answer-back trip link 143 will be restored to its right-hand position and will move the contact 195 away from the drum 151.

From the foregoing description it will be apparent that the apparatus is capable of three distinct modes of operation, as follows:

Fully manual operation—where the fixed message signal generator of a printer may have its operation initiated either on receipt, in the printer, of a code combination of signals calling for such operation or by operation of the "Here Is" key 17;

Semi-automatic operation—where the fixed message signal generator may have its operation initiated either by operation of the "Here Is" key 17 and where the answer-back drum 151 is coded with an answer-back code combination, such as "Figs-D," at the end of its identification code combinations to initiate operation of a fixed message generator at a remote station, or by operation of the answer-back trip magnet 178 by a circuit extraneous to the printer itself; and Fully automatic operation—where the answer-back drum 151 of the printer is coded with an answer-back code combination in addition to its station identification combinations and the operation of the fixed signal generator at the local printer is initiated by the answer-back trip magnet 178.

The provision in the apparatus of the answer-back drum 151 which has its tine removed in the first row of the level aligned with the first character blinding contact 195, permits the apparatus to respond to a code combination received from the reader 31 to initiate a cycle of operation of a distant fixed message signal generator without garbling the first character of the station identification code combinations. When the station identification or answer-back cycle is initiated by the reader 31, the tape being read will have the answer-back code combination punched in it and this will cause the combination to be transmitted over the line to a distant printer through the operation of the distributor 22. (At this point it should be remembered, as pointed out hereinbefore, that an operation of the answer-back drum 151 cannot be initiated by locally generated signals.)

The code combinations of signals calling for an answer-back, transmitted by the distributor 22 and sent over the line, will initiate a cycle of operation of the answer-back drum 151 at the remote station and the local reader 31 must be stopped immediately upon sending the answer-back call code combination to prevent the local reader from garbling the first character of the station identification group of station identifying characters. The normally closed contact pair 50 which is in the circuit to the reader trip magnet 54 is opened by a function pawl to stop the reader 31 upon the reader reading an answer-back calling code combination. This contact 50 will be opened during the function cycle of the printer which occurs almost a full cycle of the printer after the corresponding cycle of the distributor 22. Therefore, the reader 31 will be sensing the next code combination in the tape and will prepare the circuits to the distributor 22 and a cycle of the distributor will have been initiated before the reader stops. Unless prevented this character representing code combination would thus combine with the first character of the station identification code combination to begin the answer-back or station identification with a garbled code combination. Such an undesirable result is prevented by the shunting of the outgoing line by the first character blinding contact 195.

The answer-back drum 151 has been described hereinbefore as having a single indentation 153 in its cam 152. However, this cam could be provided with more than one such indentation to handle station identification code sequences of shorter length so that the drum would be driven through a part of a cycle of rotation for each identification message. For example, if an identification message comprising six characters is to be transmitted by the fixed message signal generating answer-back drum, three indentations 153 could be made in the drum 151 and it would only go through one-third of a cycle each time its operation was initiated.

Another mode of operation of the apparatus, involving an alternate use of the answer-back suppression contact 185, may be effected by breaking out tines in the answer-back drum 151 aligned with contact 185 in all rows of the drum following the station identification fixed message and the calling answer-back code combinations. This will shorten the time interval for fully automatic answer-back operations since the rows of the drum not used for the fixed message will be stepped past the contacts 117 during the interval when the local printer is receiving and printing the station identification characters of the remote printer and due to the shunting of the distributor 22 no signals will be impressed on the line by the local printer.

Although a particular embodiment of the invention is shown in the drawings and described in the foregoing specification, it will be understood that the invention is not limited to that specific embodiment, but is capable of modification and rearrangement, and substitution of parts and elements without departing from the scope of the invention.

What is claimed is:

1. In a printing telegraph printer having a distributor for sequentially applying signals as set up in the printer to an outgoing line, keyboard operated contacts for permutatively setting up the signals to control the distributor, clutch means for driving said distributor, and means in said keyboard for initiating a single cycle of operation of said clutch means each time a key in the keyboard is operated; a fixed message signal generator, contacts in said generator connected to said distributor, additional means for initiating operation of said clutch means and starting the fixed message signal generator, means actuated by said additional means for holding said clutch operated to drive said generator step-by-step through a cycle of operation, means in said fixed message signal generator to actuate said contacts to represent a predetermined code combination at each step of the generator for controlling the output of the distributor, and means also actuated by said additional means for blinding said distributor to the code combination represented on the first step of said fixed message signal generator.

2. The combination of a key controlled telegraph printer having printing means in it, a distributor connected to an outgoing telegraph line, key controlled contacts for controlling the output of said distributor, clutch means for driving said distributor, clutch tripping means operable under control of the keys each time a key is operated to drive the distributor through a single cycle of operation, and a selector mechanism for controlling the printing means to print a monitor copy in the printer and for also controlling the functional operations of the printer; with a telegraph station identification signal generator apparatus comprising a drum having on its periphery tines arranged in a predetermined order for setting up permutation code combinations to control said distributor, a signal generator controlling key and a signal controlled function device individually operable for tripping said clutch to initiate a cycle of rotation of said drum, and means driven by said clutch for preventing the signal controlled function device from initiating a cycle of said drum during any cycle of the distributor.

3. The apparatus according to claim 2 wherein the answer-back drum is coded to transmit an answer-back code combination of signals in addition to its own identification signals.

4. The apparatus according to claim 3 wherein the answer-back code combination of signals as coded on the answer-back drum are prevented from being sent to the line by a shunting contact operated each time an operation of the drum is initiated in response to the receipt of an answer-back code combination of signals in the printer.

5. In a printing telegraph printer having a signal responsive selector mechanism, code bars settable by said selector mechanism under control of incoming signals, a transmitting distributor connected to an outgoing line and to said selector mechanism, a keyboard and a tape reader for controlling said distributor, and a clutch for driving said distributor; a fixed message signal generator connected to said distributor, a fixed message generator function lever selectable by operation of said code bars, a fixed message generator pawl for actuation by said function lever upon its selection, a bail connected to said pawl for operation thereby, a trip link operated by said bail for initiating a cycle of operation of said fixed message generator to control said distributor, camming means connected to said distributor and driven therewith, a blocking link reciprocated by said camming means in each cycle of the camming means, and a blocking lever actuated by said blocking link and having an extension thereon which is moved to blocking relation to said fixed message generator pawl each time the blocking lever is actuated to prevent the fixed message generator function pawl from being actuated by said function lever, whereby operation of the fixed message signal generator is prevented in response to incoming signals during every cycle of locally generated characters.

6. In a printing telegraph printer having signal responsive selector mechanism, code bars settable by said selector mechanism under control of incoming signals, a transmitting distributor connected to an outgoing line and to said selector mechanism for directing signals to said line and said selector mechanism, a keyboard and a tape reader for controlling said distributor, and a clutch for driving said distributor; a station identification signal generator also connected to said distributor, means controlled by the code bars for initiating operation of said station identification signal generator to transmit station identification code combinations of signals through the distributor to the line, and means also driven by said clutch for blocking operation of the means controlled by the code bars, whereby the station identification signal generator is blocked from responding to incoming signals during every cycle of locally generated characters.

7. The apparatus according to claim 6 wherein a reader trip magnet is provided, said reader is operated under control of the reader trip magnet and said magnet when operated renders the keys in the keyboard ineffective to control said clutch.

8. The apparatus according to claim 6 wherein a reader trip magnet is provided and tripping of said clutch is blocked by the armature of the reader trip magnet to block operation of the keyboard clutch trip lever.

9. In a printing telegraph printer having a signal responsive selector mechanism, code bars settable by said selector mechanism under control of incoming signals, a transmitting distributor connected to an outgoing line and to said selector mechanism, a keyboard and a tape reader connected to said distributor to control it, and a clutch for driving said distributor; a fixed message signal generator also connected to said distributor to control it, means selectable for actuation by operation of said code bars, means positioned to be actuated by said selectable means upon its selection for initiating a cycle of operation of said fixed message generator to control said distributor, camming means connected to said distributor to be driven therewith, and means actuated by said camming means in each cycle of it to block the selectable means from engagement with and actuation of the means for initiating a cycle of the fixed message generator, whereby operation of the fixed message signal generator is blocked from responding to incoming signals during every cycle of operation initiated by operation of the reader, fixed message signal generator, or the keyboard.

10. In a printing telegraph apparatus having signal responsive printing means in it, an answer-back drum having means on it coded to control the transmission of code combinations of signals representative of the address of a local printer followed by an answer-back code combination of signals over a telegraph line, means for driving said answer-back drum through a cycle of rotation to cause it to transmit said signals to a remote printer thereby to send the address of the local printer to said remote printer and then initiate an operation of the answer-back drum of the remote printer, and means responsive to the receipt of an answer-back code combination of signals from the remote printer for preventing a second transmisison of an answer-back signal by the local printer whereby two-way identification is achieved without initiating endless cycles of identification signal transmission.

11. The apparatus according to claim 10 wherein the signal responsive printing means includes an answer-back pawl which is selected for operation upon receipt in the printer of an answer-back code combination of signals to initiate a cycle of operation of the answer-back drum, and wherein there is provided means actuated by said function pawl upon its operation for conditioning a line shunting circuit for operation, and means on said drum for preventing said operation of the shunting circuit at all positions of the drum except the positions having the answer-back code combination on it.

12. In a printing telegraph apparatus, a distributor having a plurality of code segments, a common ring and a brush for sequentially interconnecting the code segments to one side of an outgoing line through the common ring, an answer-back drum having signal controlling tines on its periphery, contact springs connected to the code segments of said distributor and biased to sense the presence or absence of tines on the drum, a common contact member for engagement by said springs and connected to the other side of said outgoing line, said tines on said answer-back drum being coded to transmit an address and an answer-back combination of signals through said distributor, manually operable means for initiating a cycle of operation of said answer-back drum, signal responsive means for also initiating a cycle of operation of said answer-back drum, and an answer-back suppression contact actuated by said signal responsive means for shunting the outgoing line whereby upon manual initiation of operation of a local printing apparatus the address of the local station will be transmitted to a remote printing apparatus and the address of the remote printing apparatus will be transmitted back to the local printing apparatus to achieve two-way identification.

13. In a printing telegraph apparatus, a station identification mechanism including an answer-back drum, contact actuating tines integral with said drum and arranged on said drum in a plurality of circumferentially extending levels and axially extending rows to represent a permutation code combination in each row, a common contact bar extending axially of said drum and spaced therefrom, contact springs extending transversely of said contact bar and biased toward tangential engagement with said drum and into engagement with the contact bar, said tines being readily removable from said drum to set up a representation of a selected permutation code combination in each row and said tines when not removed serving to hold the contact springs out of engagement with said contact bar, control tines on said drum having line shunting contact aligned with them for selective operation by them at selected stepped positions of the drum, means for rotating said drum step-by-step to present a row of said ties to the contact springs at each step, and a transmitting distributor connected to said contact springs for transmitting the code combination of the row presented to the contact springs at each step over an outgoing line.

14. In a printing telegraph apparatus a station identification mechanism including an answer-back drum, contact actuating tines integral with said drum and arranged on said drum in a plurality of circumferentially extending levels and axially extending rows to represent a permutation code combination in each row, a common contact bar extending axially of said drum and spaced therefrom, contact springs extending transversely of said contact bar and biased toward tangential engagement with said drum and into engagement with the contact bar, said tines being readily removable from said drum to set up a representation of a selected permutation code combination in each row and said tines when not removed serving to hold the contact springs out of engagement with said contact bar, means for rotating said drum step-by-step to present a row of said tines to the contact springs at each step, a transmitting distributor connected to said contact springs for transmitting the code combination of the row presented to the contact springs at each step over an outgoing line, wherein the presence of a tine at a predetermined level causes the distributor to transmit a spacing or no current signal at that level and the absence of a tine permits the contact spring at that level to engage the common contact bar to transmit a marking or current signal and said drum is provided with circumferentially extending levels of control tines having aligned with them control contacts for engaging said common contact bar for shunting said line at positions of said drum where the control tines have been removed, said control contacts being selectively engageable with said tines for control thereby.

References Cited in the file of this patent

UNITED STATES PATENTS

| | | |
|---|---|---|
| 2,147,249 | Franklin | Feb. 14, 1939 |
| 2,752,414 | Przyiecki | June 26, 1956 |

OTHER REFERENCES

Publication: RCA Technical Notes, "Automatic Answer-back Unit," RCA–TN No. 297, June 1959.